United States Patent [19]

Brand

[11] 4,016,969
[45] Apr. 12, 1977

[54] FLOW DIVIDING MECHANISM FOR A CONVEYOR SYSTEM

[75] Inventor: Jay J. Brand, Pittsburgh, Pa.
[73] Assignee: PPG Industries, Inc., Pittsburgh, Pa.
[22] Filed: July 22, 1975
[21] Appl. No.: 598,090
[52] U.S. Cl. ................... 198/435; 198/592
[51] Int. Cl.² ................... B65G 47/30
[58] Field of Search .......... 198/20 T, 31 AC, 31 R, 198/91, 94, 27, 83, 435, 436, 601, 361, 369, 592; 193/36; 271/64; 214/1 BD

[56] References Cited

UNITED STATES PATENTS 1,875,375  9/1932  Gotthardt et al. ............ 198/94
2,478,610  8/1949  Uschmann et al. ............ 271/64 X

FOREIGN PATENTS OR APPLICATIONS 272,888  6/1970  U.S.S.R. ............ 271/64

Primary Examiner—Evon C. Blunk
Assistant Examiner—James L. Rowland
Attorney, Agent, or Firm—Donald Carl Lepiane

[57] ABSTRACT

A flow dividing mechanism for a conveyor system to change the flow of an article, e.g., a plurality of glass sheets includes (1) a first conveyor section positioned between first and second conveyors and pivotally mounted to the first conveyor to provide a first article movement path and (2) a second conveyor section pivotally mounted to an end of a third conveyor with the second conveyor section vertically spaced from the second conveyor. The free end of the first and second conveyor sections are counter balanced on an elevator mechanism for (1) simultaneously pivoting the sections toward each other to interconnect the first and third conveyors to provide a second article movement path and (2) simultaneously pivoting the sections away from each other to interconnect the first and second conveyors to provide the first article movement path. Counter balancing the conveyor sections on an elevator mechanism provides rapid operation of the flow gate to change the flow of the glass sheets from the first article movement path to the second article movement path.

28 Claims, 11 Drawing Figures

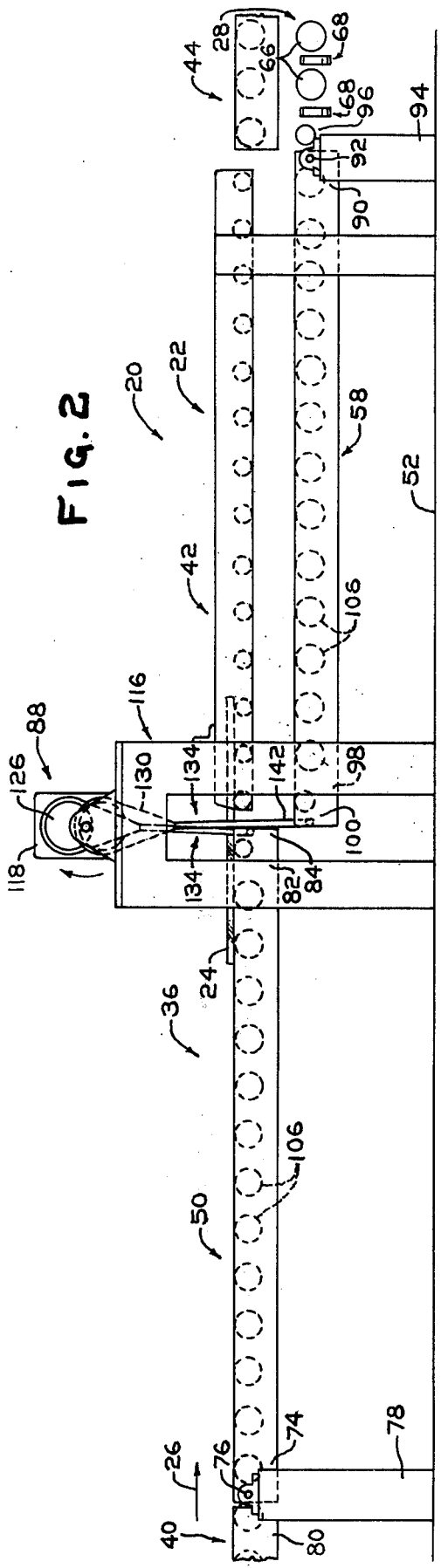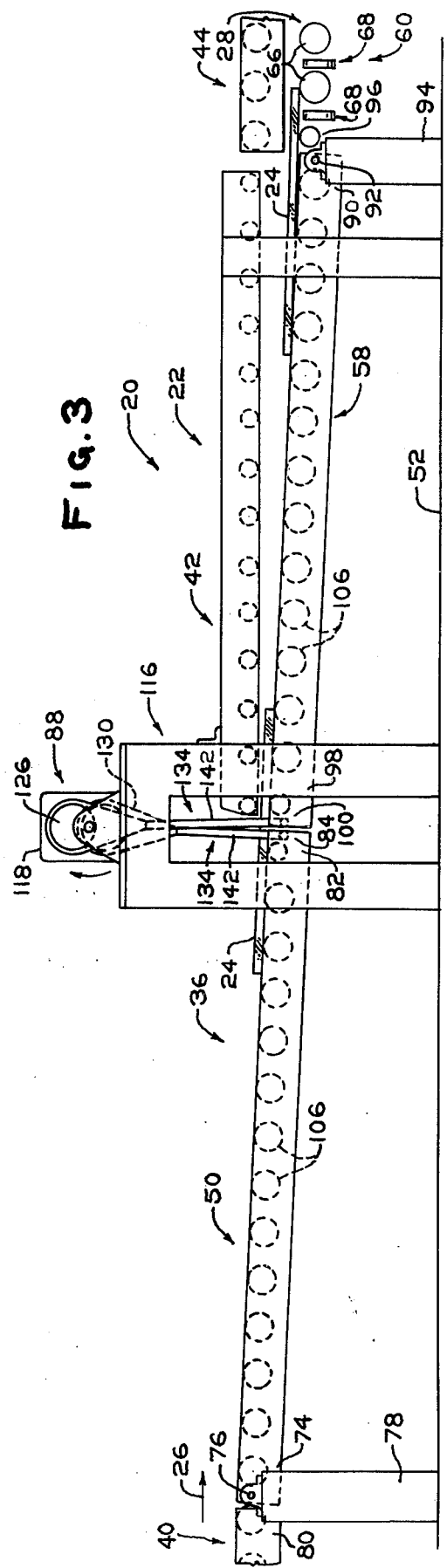

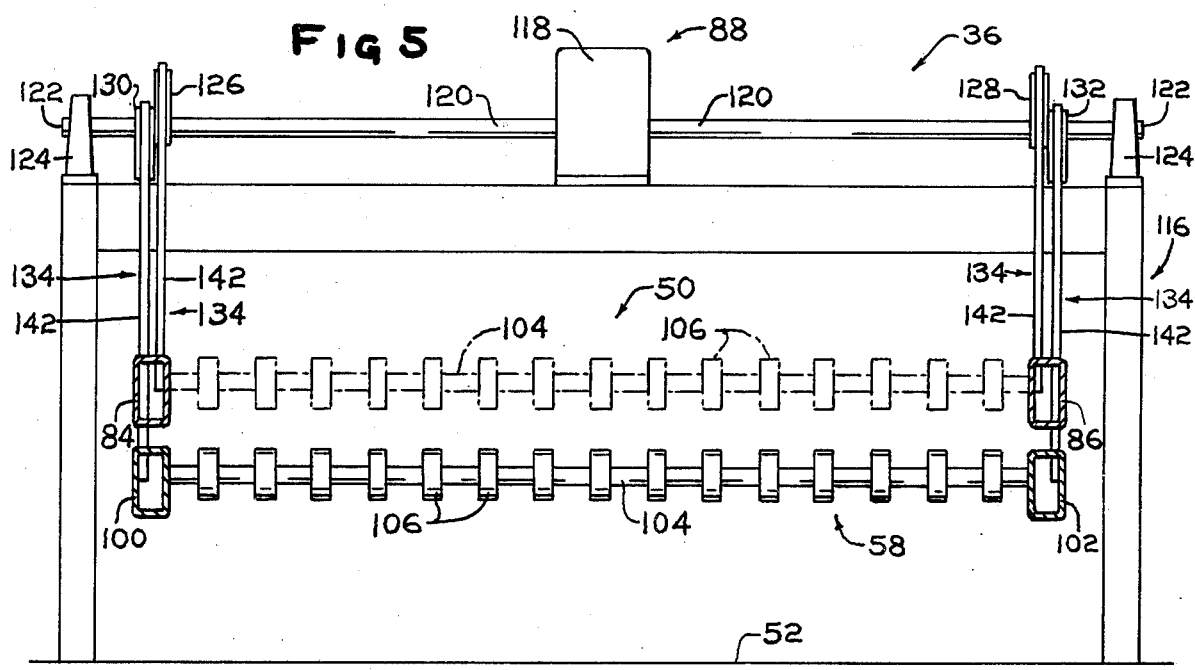
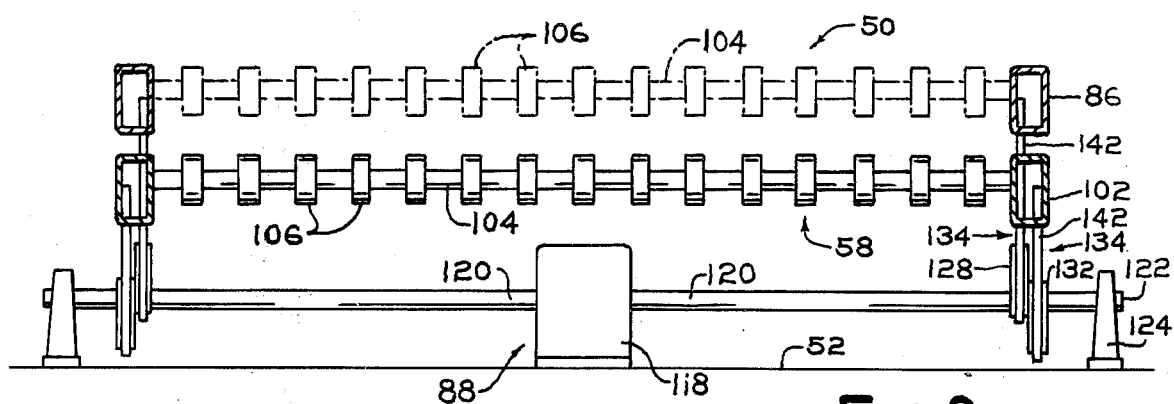
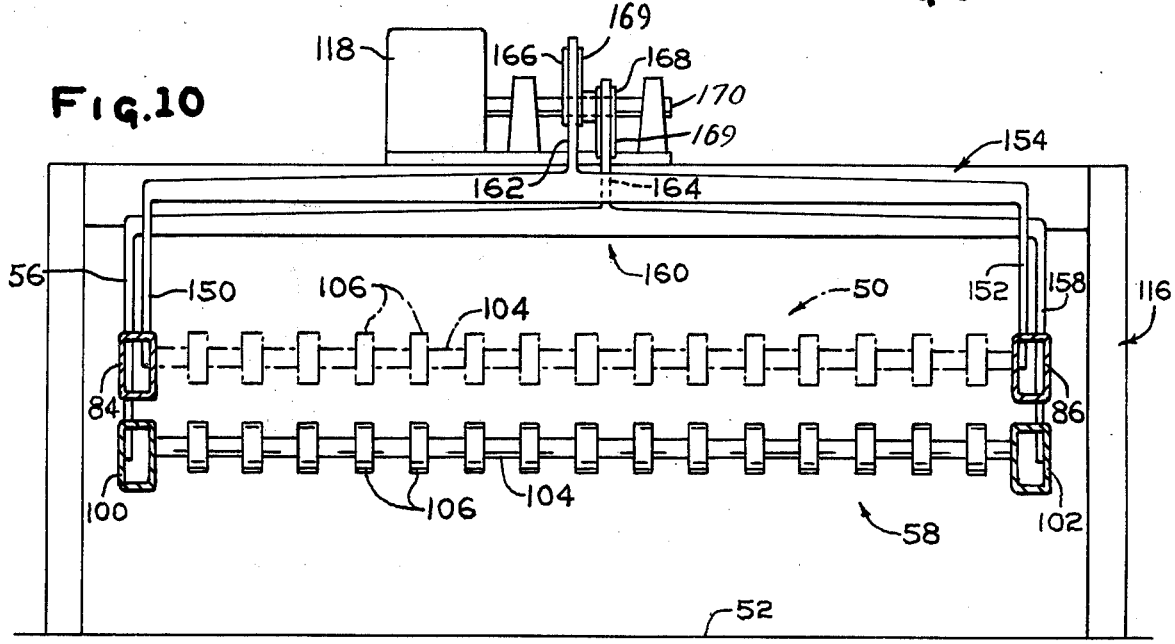

FLOW DIVIDING MECHANISM FOR A CONVEYOR SYSTEM

BACKGROUND OF THE INVENTION

1. Field of the Invention

This invention relates to a flow dividing mechanism for a conveyor system to change the flow of an article, e.g., a glass sheet from a first article movement path to a second article movement path.

2. Discussion of the Prior Art

Flow dividing mechanisms or flow gates are used with conveying systems to change the flow of an article from a first article movement path to selected ones of different article movement paths.

Russian Pat. No. 272,888 teaches a flow dividing mechanism employed to divide a continuous flow of sheet glass into two intermittent ones, i.e., from a first and second conveyor to a first and third conveyor. In general, the flow dividing mechanism includes (1) a first roller-table spacer, all the rollers of which, except the first one, have autonomous drives which ensure the transformation of the first spacer from a horizontal initial position to a second inclined position and vice versa and (2) a second roller-table spacer pivotally mounted about its first roller to move from a horizontal initial position to a second inclined position to be aligned with the axis of the inclined first roller-table spacer and misaligned with the axis of the third conveyor.

A glass sheet moves from the first conveyor onto the first roller-table spacer at which time all the rollers are simultaneously lowered into the inclined second position and the second roller-table spacer is rocked to the inclined second position aligned within the first spacer to receive the glass sheet. The first and second roller-table spacers are then moved to their initial positions to move a second sheet onto the first roller-table spacer while the sheet on the second roller-table space is moved to the third conveyor.

The flow dividing mechanism taught in the above-mentioned Russian Patent has drawbacks. For example, to advance the sheet along its path, the axis of the second roller-table has to be aligned with the third conveyor. In order to move a large number of consecutive sheets to the third conveyor (1) the roller-table spacers have to be moved frequently from their initial position to the second position or (2) roller-tables of extended length have to be used. This type of flow gate (1) accelerates the wear on the moving parts, (2) is not readily adaptable to high speed conveyors where the glass sheets are closely spaced e.g., about 6–10 inches apart (15.24 to 25.4 centimeters) and move at speeds of greater than about 150 feet per minute (45.72 meters per minute) and (3) are expensive when changing the flow of a large number of consecutive sheets.

It would be advantageous therefore to provide a flow gate, i.e., a flow dividing mechanism for conveyors that does not have the drawbacks of the prior art.

SUMMARY OF THE INVENTION

In general, this invention relates to a flow dividing mechanism for a conveyor system and includes a first conveying section and a second conveying section each having a first and second end. The first end of the first conveying section is pivotally mounted in a first plane to move the second end through a first reciprocating arcuate path. The second conveying section has its first end pivotally mounted in a second plane generally parallel to the first plane to move the second end of the second conveying section through a second reciprocating arcuate path to align the second end of the conveying sections at a predetermined point along their respective arcuate path by way of elevator facilities. The elevator facilities include shaft facilities operatively connected to a motor. Facilities are operatively connected to the shaft facilities and the first and second conveying sections for simultaneously moving the second end of the conveying sections in opposed directions along their respective arcuate paths to align the second end of the conveyor sections and for applying the dynamic force of the first conveying section to the shaft facilities in an opposite direction to the dynamic force applied to the shaft facilities by the second conveying section.

This invention also relates to a method of changing the flow direction of an article from a first predetermined path along first conveyor facilities to a second predetermined path along second conveyor facilities vertically spaced from the first conveyor facilities. A section of the first conveyor facilities is pivotally mounted about a pivot point to move the free end of the section toward the second conveyor facilities through a reciprocating arcuate path having its center point at the pivot point. A section of the second conveyor facilities is pivotally mounted about a pivot point to move the free end of the section toward the first conveyor facilities through a reciprocating arcuate path having its center point at the pivot point to align the sections of the first and second conveyor facilities. At least one article, e.g., a glass sheet, is moved toward the section of the first conveyor facilities at which time a counter balancing force is applied to the sections to align their free ends. The article is then moved along the section of the conveyor facilities, i.e., along the second article movement path.

BRIEF DESCRIPTION OF THE DRAWING

FIG. 2 is a side view of a flow gate of the invention in its initial position to move an article along a main line conveyor;

FIG. 3 is a view similar to FIG. 2 showing the flow gate of the invention in its second position to interconnect a portion of the main line conveyor to a side line conveyor;

FIG. 5 is a view taken along lines 5—5 of FIG. 1;

FIG. 9 is a view similar to FIG. 5 showing elevator mechanism mounted below the conveyor sections;

FIG. 10 is a view similar to FIG. 5 showing a modified elevator mechanism;

DESCRIPTION OF THE INVENTION

In the following discussion like numerals refer to like elements.

Figure 1:
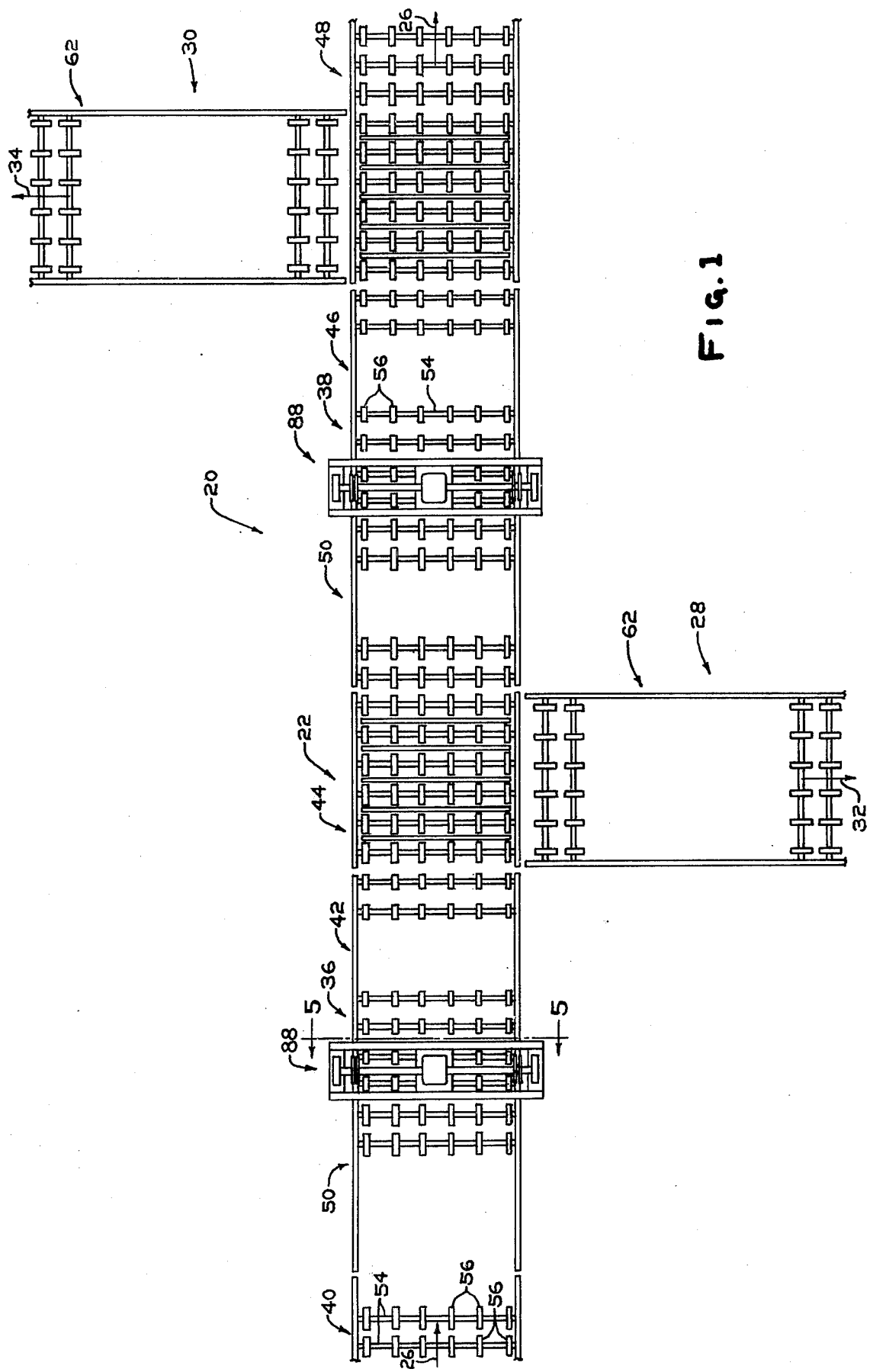
FIG. 1 is a plan view of a conveying system incorporating the flow gates of the invention.

Referring to FIG. 1, there is shown a conveying system 20 having a main line conveyor 22 for moving an article 24 (shown in FIGS. 2 and 3) e.g., a sheet of glass along a first predetermined path designated by the arrows 26 and side line conveyors 28 and 30 for moving the article 24 along a second and third predetermined path designated by arrows 32 and 34, respectively. Flow dividers or flow gates 36 and 38 incorporating features of the invention interconnect portions of the main conveyor 22 to the side line conveyors 28 and 30 to change the flow of the article from the first predetermined to the second or third predetermined path, respectively. As will become apparent the invention is not limited to the number of flow gates or side line conveyors.

The main conveyor 22 which includes conveyor sections 40, 42, 44, 46 and 48 and conveyor sections 50 of the flow gates 36 and 38 although not limiting to the invention may be advantageously mounted in a wareroom of a glassmaking plant to move glass sheets cut from a continuous glass ribbon through the wareroom onto selected ones of the side line conveyors 28 and 30. The conveyor sections 40, 42, 44, 46 and 48 are supported above floor 52 (see FIG. 2) in any conventional manner. The conveyor sections are of the doughnut wheel type which include a plurality of spaced positively driven shafts 54 for uniform article flow. Each shaft has a plurality of wheels 56 mounted thereon for supporting and conveying the article 24. The shafts 54 may be positively driven in any conventional manner. As can be appreciated, the conveyor sections 40, 42, 44, 46 and 48 are not limited to dougnut wheel type conveyors shown in the drawing but may be belt type conveyors, roller type conveyors or air type conveyors.

Referring now to FIGS. 1, 2 and 3, each of the side line conveyors 28 and 30 include a conveyor section 58 of the flow gates 36 (shown in FIGS. 2 and 3) and 38, a corner turning table 60 (shown better in FIG. 4) and conveyor sections 62 (one shown) in FIG. 1. The corner turning table 60 may be of the type used in the art to change the flow direction of the article. For example and with reference to FIG. 4, the corner turning table 60 may include a plurality of spaced rotatably mounted shafts 64 each having a plurality of wheels 66. The shafts are advantageously mounted for movement along a reciprocating vertical path. A plurality of endless belt conveyors 68 are advantageously mounted between the shafts 64 and have their engaging surface below the engaging surface of the wheels 66 as shown in FIGS. 2 and 3. An article 24 is moved from conveyor section 58 onto the corner turning table 60 by way of wheels 68 as shown in FIG. 3. After the article has cleared the conveyor section 58, a switch 70 of the type known in the art is engaged to lower the shafts 64 to move the article into engagement with the belt conveyors 68. The belt conveyors 68 move the article from the corner turning table onto the conveyor section 62 shown in FIG. 1. A switch 72 of the type known in the art is activated as the trailing edge of the article 24 moves from the corner turning table 60 onto the conveyor section 62 to raise the shafts 64. The corner turning table 60 is now ready to receive the next sheet from the conveyor section 58.

As can now be appreciated the invention is not limited to the type of corner turning table used to change the flow direction of the article. For example, the corner turning conveyor taught in U.S. patent application Ser. No. 440,898 filed on Feb. 8, 1974, in the names of J. A. Goldinger and D. R. Peterson and entitled "Method and Apparatus for Transferring Articles from a Conveyor" now U.S. Pat. No. 3,921,789 may be used in the practice of the invention and the teachings of the above-identified application are hereby incorporated by reference.

The conveyor section 62 which is similar to conveyors 40, 42, 44, 46 and 48 moves the article toward processing stations. For example, in the instance where the articles are sheets of glass, the sheets of glass may be moved toward a multicut machine of the type taught in U.S. Pat. No. 3,151,794, or toward a sheet transporter of the type taught in U.S. Pat. No. 3,838,779. The teachings of the above-identified patents are hereby incorporated by reference.

As is now apparent, the conveyor sections 40, 42, 44, 46 and 48 and 62 and corner turning table 60 are not limiting to the invention and are present to illustrate the environment in which the flow gate of the invention may be used.

Referring now to FIGS. 1, 2, 3, and 5 the discussion will be directed to the flow gates 36 and 38 incorporating features of the invention. The flow gates 36 and 38 are identical in construction and the following discussion will be directed to the flow gate 36 with the understanding that the discussion is also applicable to the flow gate 38 unless indicated otherwise.

With specific reference to FIGS. 2 and 3, the conveyor section 50 has end 74 pivotally mounted at 76 on post 78 adjacent end 80 of the conveyor section 40 and end 82 supported at opposed sides 84 and 86 for vertical reciprocal movement along an arcuate path by elevator 88 in a manner to be discussed below. The conveyor section 58 has end 90 pivotally mounted at 92 on post 94 adjacent end 96 of the corner turning table 60 and end 98 supported at opposite sides 100 and 102 for vertical reciprocal movement along an arcuate path by the elevator 88.

Figure 6:
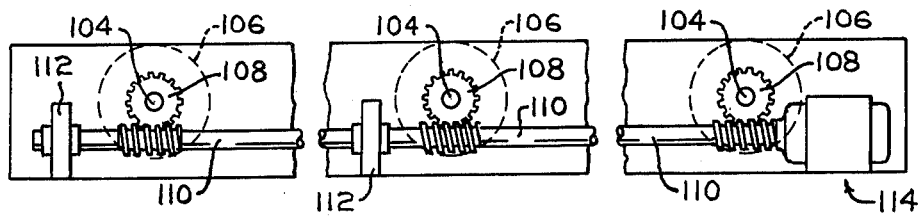
FIG. 6 is a fragmented side view of a conveyor section illustrating a drive system that may be used in the practice of the invention to positively drive the shafts of the conveyor sections.

The conveyor sections 50 and 58 are identical in construction and include a plurality of spaced rotatably mounted shafts 104 each having a plurality of doughnut type wheels 106 for supporting and conveying the article. The shafts 104 may be positively rotated in any conventional manner. For example and with reference to FIG. 6, an end of each of the shafts 104 is provided with a worm gear 108 which engages a worm shaft 110. The worm shaft 110 has portions and an end rotatably mounted in bearing blocks 112 mounted on the side rail of the conveyor section and the other end operatively connected to a motor 114 advantageously mounted on the side rail of the conveyor section.

As will become apparent the invention is not limited to the type of conveyor employed in the flow gates 36 and 38. For example, endless belt type conveyors or roller type conveyors may be used.

The elevator 88 of the flow gates 36 and 38 is supported above the main line conveyor 22 by superstructure 116 as shown in FIGS. 2 and 3. In general and with reference to FIG. 5, the elevator 88 includes a motor 118 operatively connected to a shaft 120 having its ends 122 rotatably mounted in bearing blocks 124. A first pair of camming members 126 and 128 and a second pair of camming members 130 and 132 are advantageously secured on the shaft 120 and operatively connected to the opposite sides 84 and 86 of the conveyor section 50 and to the opposite side 100 and 102 of the conveyor section 58 by way of yoke 134 (see also FIGS. 2 and 3).

Figure 7:
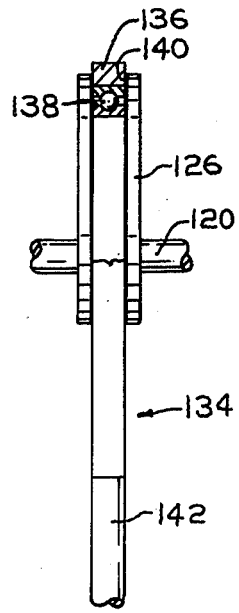
FIG. 7 is a fragmented side view of a camming member and yoke that may be used in the practice of the invention.
Figure 8:
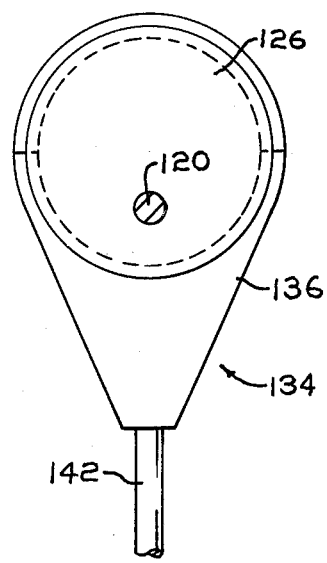
FIG. 8 is a frontal view of the camming member and yoke shown in FIG. 7.

Each of the yokes 134 includes a collar member 136 having ball bearings 138 and captured for rotational movement in a groove 140 provided on the periphery of each of the camming members, e.g., camming member 126 shown in FIGS. 7 and 8. A rod 142 has one end connected to the collar member 136 and the other end pivotally connected at a side of the conveyor sections 50 and 58 for raising and lowering the conveyor sections as the camming members are rotated.

The camming members 126, 128, 130 and 132 are mounted on the drive shaft 120 as shown in FIGS. 5 and 8 to simultaneously raise and lower or lower and raise the conveyor sections 50 and 58 about their pivot point by way of the yokes 134. With reference to FIG. 2, in their initial position the conveyor section 50 interconnects conveyor sections 40 and 42 to provide a continuous path to move the articles along the first predetermined path and the conveyor section 58 is vertically spaced from the conveyor section 42. To change the flow direction of the article, the motor 118 rotates the shaft 120 and camming members 126, 128, 130 and 132 in a clockwise direction as viewed in FIG. 2 to lower the conveying section 50 while raising the conveyor sections 58 about their respective pivot points 76 and 92. After the shaft 120 has rotated through about 180°, the ends 82 and 98, i.e., the axis of the conveyor sections 50 and 58, respectively, are aligned as shown in FIG. 3 and the conveyor sections 50 and 58, i.e., the flow gates 36 or 38 are in the second position. The flow path of the article is now along the conveyor sections 40, 50 and 55, corner turning table 60 and conveyor section 62, i.e., the second or third article movement path. The conveyor sections 50 and 58 are moved to their initial position by further rotating the shaft 120 through about 180° in a clockwise direction as viewed in FIGS. 2 and 3.

As can now be appreciated, a conveyor section (now shown) may be aligned with conveyor section 58 when it is in its initial position to provide still another article movement path.

The flow gate or flow divider mechanism of this invention provides a rapid change in the flow direction of an article, e.g., a rapid change from a first article movement path to a selected one of a plurality of other article movement paths. This is because the weight of the conveyor sections is counter balanced on the shaft 120 which minimizes the initial starting force to be overcome by the motor 118. In other words, the force the motor 118 has to overcome to start rotating the shaft 120 to raise or lower the conveyor sections 50 and 58 e.g., to move the conveyor sections 50 and 58 from their initial position to the second position. The force required to raise the conveyor section 58 is minimal because the conveyor section 50 is moving downward under the force of gravity to apply a force opposite to the force required to raise the conveyor section 58. When the conveyor sections are moved from their second position to their initial position, force is required to raise the conveyor section 50 but the conveyor section 58 moving downward applies a counter force to the shaft 120. In the instant when the conveyor sections are approximately equal in weight the resultant force acting on the shaft 120 is about zero. Because the resultant forces acting on the shaft 120 are approximately equal the flow gates operate rapidly, e.g., raised or lowered 6½ inches 16.51 centimeters) in one second.

Another advantage of the flow gate of the invention is that a motor having reduced torque may be used thereby decreasing the cost of the flow gate. For example a 2 to 3 horsepower motor can be used to raise conveyor sections each weighing 5 tons (4.5 metric tons).

Still another advantage is that any number of consecutive sheets may be moved from the main conveyor to a selected one of the slideline conveyors. This is because (1) the end 74 of the conveyor section 50 is connected to the end 80 of the conveyor section 40, (2) the ends 82 and 98 of the conveyor sections 50 and 58, respectively, of the flow gates are aligned and (3) the end 90 of the conveyor section 58 is connected to corner turning table 60 as shown in FIG. 3 to provide a continuous path from the main line conveyor to a sideline conveyor.

In some prior art flow gates, e.g., Russian Pat. No. 272,888, only a limited number of consecutive sheets could be moved because the flow gate does not provide a continuous path.

As can now be appreciated, the length of the arc subtended by the ends 82 and 98 of the conveyor sections 50 and 58, respectively, and the speed of the ends moving through the arc are not limiting to the invention. However, it is recommended that as the distance between the articles decrease, the length of the arc subtended by the ends of the conveyor sections 50 and 58 be decreased and/or the speed at which the ends move through the arc be increased.

In general, the speed at which the ends of the conveyor sections 50 and 58 move is a function of motor speed and vertical displacement speed of the yokes 134. For a constant motor speed increasing the vertical displacement speed of the yokes 134 increases the speed at which the ends of the conveyor sections 50 and 58 move. For a constant vertical displacement speed of the yokes 134, increasing the motor speed, increases the speed at which the ends of the conveyor sections 50 and 58 move.

The vertical displacement and vertical displacement speed of the yokes, in general, is a function of the distance between the center of the camming member and the axis of the shaft 120 (see FIG. 8). As the distance between the center of the camming member and the axis of the shaft 120 increases, the vertical displacement speed of the yokes decrease and vice versa.

The length of the arc subtended by the ends of the conveyor sections 50 and 58, in general, is a function of the distance between the ends 82 and 98 of the conveyor sections 50 and 58, respectively, in their initial position. As the distance between the ends increases he length of the arc to align the free ends of the conveyor section, i.e., align their axis increases and vice versa.

In FIGS. 2 and 3, the wheels of conveyor section 42 are shown to be smaller in diameter than the wheels of adjacent conveyor sections. This is to provide a clearance between end 98 of the conveyor section 58 and adjacent end of the conveyor section 42 when the flow gate is in its second position while reducing the length of the arc.

As can now be appreciated, other expediencies may be used to raise and lower the conveyor sections 50 and 58. For example and with reference to FIG. 9, the elevator 88 may be mounted on the floor 52 below the conveyor sections 50 and 58.

In FIG. 10, there is shown still another embodiment of the invention for raising and lowering conveyor sections 50 and 58. The sides 84 and 86 of the conveyor section 50 are advantageously connected to arms 150 and 152, respectively, of bifurcated member 154 and the sides 100 and 102 of the conveyor section 58 are advantageously connected to arms 156 and 158 respectively, of bifurcated member 160. Center arms 162 and 164 of the bifurcated members 154 and 160 are rotatably mounted on camming surfaces 166 and 168, respectively, of camming member 169 in a similar manner as yokes 134 are mounted on camming members 126, 128, 130 and 132. The camming member 169 is mounted on shaft 170 operatively connected to the motor 118 which rotates to raise and/or lower the conveyor sections 50 and 58 as previously discussed.

As can now be appreciated camming members 126 and 130 shown in FIG. 5 can be replaced by camming member 169 having opposed camming surfaces 166 and 168.

Figure 11:
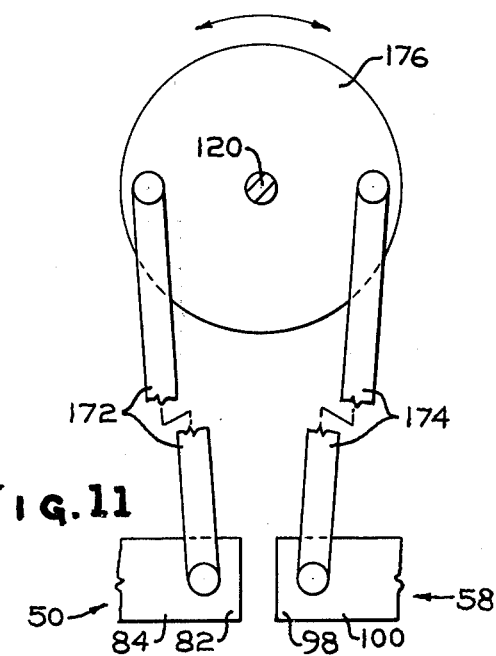
FIG. 11 is a fragmented side view of the conveyor section illustrating an alternate embodiment of a drive system that may be used in the practice of the invention to positively drive the shafts of the conveyor sections.

Shown in FIG. 11 is still another embodiment that may be used in the practice of the invention. The sides 84 and 86 (side 84 only shown in FIG. 11) of the conveyor section 50 is pivotally connected at the end 82 to one end of a rod 172 and the sides 100 and 102 (side 100 only shown in FIG. 11) of the conveyor section 58 is pivotally connected at the end 98 to one end of a rod 174. The other end of each of the rods 172 and 174 is pivotally mounted on a wheel member 176, 180° apart on a circle having its center axis coincident with the center axis of the wheel members 176 (one shown in FIG. 11). The wheel members 176 are mounted at their center axis on the shaft 120. Rotating the wheel members 176 in a counter clockwise direction as viewed in FIG. 11 lowers the conveyor section 50 while raising the conveyor section 58 rotating the wheel members in a clockwise direction as viewed in FIG. 11 raises the conveyor section 50 while lowering the conveyor section 58.

In the alternative, the rods 172 and 174 may be replaced by a pair of cables. Further, the rods 172 and 174 may be replaced by a cable having one end attached at end 82 of the conveyor section 50, the intermediate portion functionally engaged at the periphery of a wheel, and the other end connected at end of the conveyor section 58. Another embodiment encompassed by the invention is to replace each of the rods 172 and 174 by a cable having one end connected to side 84 of the conveyor section 50, the intermediate portion functionally engaged at the periphery of a wheel and the other end connected to a counter weight. A similar arrangement is provided at the end 98 of the conveyor section 58.

Further, as can now be appreciated, the camming members may be replaced by camming the surface of the shaft 120.

As can now be appreciated, the main line conveyor 22 may be mounted below the side line conveyors 28 and 30. Further, the energizing of the motor 118 to change the flow direction of the articles is not limiting to the invention and may be operated manually or may be operated by a programmed computer.

BRIEF DESCRIPTION OF THE INVENTION

The flow gate of flow divider mechanism of the invention will be described to change the flow direction of a plurality of glass sheets about 60 inches (1.5 meters) by 130 inches (3.3 meters) cut from a continuous glass ribbon (not shown).

With reference to FIG. 1, main line conveyor 22 has a width of about 160 inches (4.0 meters) and is supported in any conventional manner about 43 inches (1.1 meters) above floor 52 (see FIGS. 2 and 3). The main line conveyor 22 includes doughnut wheel type conveyor sections 40, 42, 44, 46 and 48 and conveyor sections 50 of flow gates 36 and 38. The wheels of the conveyor sections 40, 42, 44, 48 and 50 each have a diameter of about 6 inches (15.24 centimeters) and the wheels of conveyor sections 42 and 44 each have a diameter of about 4 inches (10.16 centimeters).

Mounted about 12½ inches (0.32 meter) below each of the conveyor sections 42 and 46 is a conveying section 58 of the flow gates 36 and 38 which along with corner turning table 60 (shown in FIG. 4) and conveyor section 62 make up sideline conveyors 28 and 30. The conveyor section 62 may be connected to a multi-cut machine such as the type taught in U.S. Pat. No. 3,151,794 or a stacking station (neither shown).

The conveyor sections 58 and 62 each have a width of about 160 inches (4.0 meters). The corner table 62 is about 160 inches (4.0 meters) by 160 inches (4.0 meters). The doughnut type wheels of the conveying sections 58 and 62 and of the corner turning table 62 are about 6 inches (15.24 centimeters) in diameter. Preferably the doughnut type wheels of the main line conveyor and side line conveyors are rubber to prevent marring of the glass surface.

The flow gates 36 and 38 are identical in construction and one flow gate, i.e., flow gate 36 will be discussed with the understanding that the discussion is applicable to the other flow gate unless indicated otherwise.

Each of the conveying sections 50 and 58 shown in FIGS. 2 and 3 are about 130 inches (3.4 meters) in length. End 74 of the conveyor section 50 is pivotally mounted at 76 to post 78 adjacent end 80 of the conveyor section 40. Pivotally mounted adjacent end 82 of the conveyor section 50 at sides 84 and 86 is a rod 142 of yoke 134 of elevator 88 (shown better in FIG. 5). The conveyor section 50 of the flow gate 38 is mounted in a similar manner between conveyor sections 44 and 46 shown in FIG. 1.

End 90 of the conveyor section 58 is pivotally mounted at 92 to post 94 adjacent end 96 of the corner turning table 62. Pivotally mounted adjacent end 98 of the conveyor section 58 at sides 100 and 102 is a rod 142 of yoke 134 of the elevator 88 (shown better in FIG. 5). The conveyor section 58 of the flow gate 38 is mounted in a similar manner below conveyor section 48 shown in FIG. 1.

With specific reference to FIG. 5, the elevator 88 includes a 2 horsepower motor 118 mounted on superstructure 116 and a shaft 120 operatively connected to the motor 118 and having its ends 122 rotatably mounted in bearing blocks 124 supported on the superstructure 116. The shaft 120 is about 180 inches (4 meters) long and 3 inches (7.62 centimeters) in diameter.

A first pair of camming members 126 and 128 is about 1 foot (0.3 meter) in diameter and 4 inches (10.16 centimeters) thick are each secured to the shaft 120 at a point spaced about 3⅛ inches (7.9 centimeters) from the center axis of the members 126 and 128. In other words and with reference to FIG. 8, the shaft 120 passes through the camming members 126 and 128 at a circle having a diameter of about 6 inches (15.24 centimeters) and having its center coincident with the center axis of the wheel member. The camming members 112 and 114 are about 169 inches (4.3 meters) apart. Collars 136 of the yokes 134 are rotatably mounted in a groove 140 on the periphery of the wheel members 126 and 128 as shown for wheel member 126 in FIG. 7. The distance between the center axis of the camming members 126 and 128 from end 82 of the conveyor section 50 is about 40 inches (10.16 meters). The members 126 and 128 are mounted on the shaft 120 such that the conveyor section 50 in its initial position has its axis aligned with the axis of the conveyor sections 40 and 42 as shown in FIG. 2.

A second pair of camming members 130 and 132 similar to the camming members 126 and 128 are each secured to the shaft 120 spaced about 173 inches (4.4 meters) apart. The collar 136 of yoke 134 is rotatably mounted on each of the wheel members in a similar manner as the yoke 134 is mounted on the wheel member 126 shown in FIGS. 7 and 8. The distance between the center axis of the wheel members 130 and 132 from the end 98 of the conveyor section 58 is about 52 1/5 inches (1.3 meters). The camming members 130 and 132 are mounted on the shaft 120 such that the conveyor section 58 lies in a generally horizontal plane having its axis aligned with the axis of the corner turning table 60 as shown in FIG. 2. The flow gates 36 and 38 are now in their initial position.

The conveyor system 20 is programmed to move the first two sheets to the side line conveyor 28, the next two sheets to the side line conveyor 30 and the next two sheets to a third side line conveyor (not shown).

With reference to FIGS. 2 and 3, as the first sheet moves onto the conveying section 40, the motor 118 is energized by a computer (not shown) to rotate the shaft 120 in a clockwise direction to move the conveyor section 50 downward and the conveyor section 58 upward as shown in FIG. 2 to align the ends 82 and 98 of the conveyor sections 50 and 58, respectively, as shown in FIG. 3. In other words, the axes of the conveyor sections 50 and 58 are aligned. The first and second sheets are sequentially moved from the conveyor section 40 onto the conveyor sections 50 and 58 and then sequentially onto the corner turning table 60.

Figure 4:
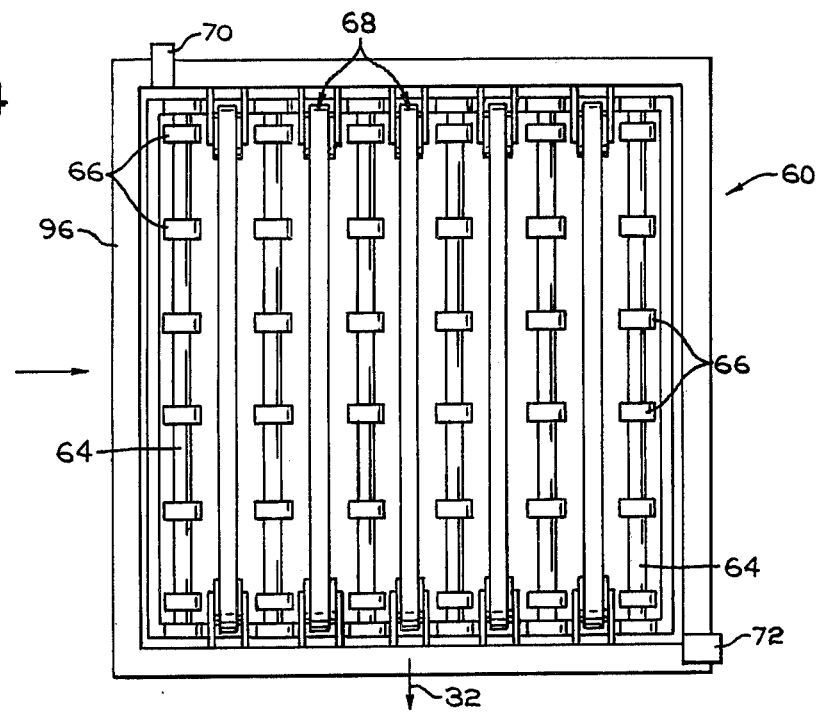
FIG. 4 is a plan view of a corner turning table that may be used in the practice of the invention.

With reference to FIG. 4, the first sheet is moved onto the corner turning table 60 by way of wheels 66. As the trailing edge of the first sheet moves past sensor 70, shafts 64 and wheels 66 are moved downward as viewed in FIG. 3 to move the first glass sheet into engagement with endless belt conveyors 68. The sheet is moved by the belt conveyors 68 onto the conveyor 62 of side line conveyor 28. As the trailing edge of the first sheet moves past sensor 72, the shafts 64 and wheels 66 are raised to receive the second sheet. In a similar manner, the second glass sheet is moved onto the conveyor section 62 of the side line conveyor 28.

When the trailing edge of the second sheet leaves the conveyor section 50 and moves onto the conveyor section 58, the motor 118 is energized to further rotate the shaft 120 in a clockwise direction as viewed in FIG. 3 to raise the conveyor section 50 while lowering the conveyor section 58. As the conveyor section 58 is lowered, the second sheet is advancing toward the corner turning table 60.

As the leading edge of the third sheet reaches the end 82 of the conveyor section 50, the conveyor section 50 is aligned with the conveyor section 42 as shown in FIG. 2.

The third and subsequent sheets are advanced toward the flow gate 38. The third and fourth sheets are advanced from the main line conveyor 22 to the side line conveyor 30 by the flow gate 38 in a similar manner as the first two sheets were moved from the main line conveyor 22 to the side line conveyor 28 by the flow gate 36. The fifth and subsequent sheets are advanced to the conveyor section 48 by the flow gate 38 in a similar manner as the third and subsequent sheets were advanced to the conveyor section 42 by the flow gate 36.

As can be appreciated, the example is merely illustrative of the invention and any sequence or any selected sheet may be moved from the main line conveyor to a select one of a plurality of side line conveyors.

What is claimed is:

1. An article flow dividing mechanism, comprising:
   a first conveying section having a first end and a second end;
   means for pivotally mounting the first end of said first conveying section to move the second end of said first conveying section through a first reciprocating arcuate path;
   a second conveying section having a first end and a second end;
   means for pivotally mounting the first end of said second conveying section in spaced relation to the first end of said first conveying section to move the second end of said second conveying section through a second reciprocating arcuate path to align the second end of said first conveying section and second end of said second conveying section at a predetermined position along their respective arcuate paths; and
   elevator means comprising:
     motor means;
     shaft means operatively connected to said motor means; and
     means operatively connected to said shaft means and said first and second conveying sections for simultaneously moving the second end of said first conveying section and the second end of said second conveying section in opposed directions along their respective arcuate paths when said motor means is energized to align the second end of said first conveying section and the second end of said second conveying section and for applying the dynamic force of said first conveying section to said shaft means in an opposed direction to the dynamic force applied to said shaft means by said second conveying section.

2. The flow dividing mechanism as set forth in claim 1 wherein said moving and applying means includes:
   said shaft means having at least two camming surfaces.

3. The flow dividing mechanism as set forth in claim 1 wherein said moving and applying means includes:
   a first pair of cam members mounted in spaced relation on said shaft means;
   means for operatively connecting said first pair of cam members to said first conveying section;

a second pair of cam members mounted in spaced relation on said shaft means; and means for operatively connecting said second pair of cam members to said second conveying section.

4. The flow dividing mechanism as set forth in claim 1 wherein said moving and applying means includes:

a first camming member mounted on said shaft means;

first means for operatively connecting said first camming member to said first conveying section;

a second camming member mounted on said shaft means; and second means for operatively connecting said second camming member to said second conveying section.

5. The flow dividing mechanism as set forth in claim 4 wherein each of said first and second operatively connecting means includes:

a member having a bifurcated end and a shaft end; and means for rotatably mounting the shaft end of said member to a one of said camming members and the bifurcated end to the respective one of said conveyor sections.

6. The flow dividing mechanism as set forth in claim 1 wherein said moving and applying means includes:

at least one wheel member mounted on said shaft means; and means for connecting said at least one wheel member to said first and second conveying sections.

7. The flow dividing mechanism as set forth in claim 6 wherein said connecting means includes:

a first rod having a first end pivotally mounted to said at least one wheel member and the second end pivotally connected to said first conveying section; and a second rod having a first end pivotally mounted to said at least one wheel member and the other end pivotally connected to said second conveying section, the first end of said second rod and said first rod mounted 180° apart in a circle having its center coincident with the axis of said shaft means.

8. In a system for conveying an article wherein the system is of the type having a first article conveying means, a second article conveying means, a third article conveying means, a first means for mounting the first and second conveying means in approximately the same plane with their adjacent ends in spaced relation, a second means for mounting the third conveying means vertically spaced from the second means, the improvement comprising:

a first conveying section having a first end and a second end;

a first means for pivotally mounting the first end of said first conveying section adjacent the first conveying means and between the first and second conveying means to provide a first article movement path along the first conveying means, said first conveying section and the second conveying means and to move the second end of said first conveying section through a first reciprocating arcuate path;

a second conveying section having a first end and a second end;

a second means for pivotally mounting said first end of said second conveying section adjacent an end of the third conveying means with the second end of said second conveying section vertically spaced from the second end of said first conveying section and to move the second end of said second conveying section through a second reciprocating arcuate path to align the second ends of said conveying sections at a predetermined position along their respective arcuate paths to provide a second article movement path along the first conveying means, said first and second conveying sections and the third conveying means; and elevator means comprising:

motor means;

shaft means operatively connected to said motor means; and means operatively connected to said shaft means and said first and second conveying sections for simultaneously moving the second end of said first conveying section and the second end of said second conveying section in opposed first directions along their respective arcuate paths when said motor means is energized to align the second end of said first conveying section and the second end of said second conveying section to provide the second article movement path and for simultaneously moving the second end of said first conveying section and the second end of said second conveying section in opposed second directions opposite to the first direction to provide the first article movement path and for applying the dynamic force of said first conveying section to said shaft means in an opposed direction to the dynamic force applied to said shaft means by said second conveying section.

9. The improved conveying system as set forth in claim 8 wherein said first and second conveying sections are wheel type conveyors.

10. The improved conveyor system as set forth in claim 8 wherein said elevator means is mounted above the first article movement path.

11. The improved conveyor system as set forth in claim 8 wherein said elevator means is mounted below the first article movement path.

12. The improved conveying system as set forth in claim 8 wherein said second conveying section and the third conveying means are mounted above the second conveying means.

13. The improved conveying system as set forth in claim 8 wherein said second conveying section and third conveying means are mounted below the second conveying means.

14. The improved conveying system as set forth in claim 8 wherein said moving and applying means includes:

a first camming means mounted on said shaft means;

first means for operatively connecting said first camming means to said first conveying section;

second camming means mounted on said shaft means; and second means for operatively connecting said second camming means to said second conveying section.

15. The improved system as set forth in claim 8 wherein the dynamic force exerted by the first conveying section on said shaft means is approximately equal to the dynamic force exerted by the second conveying section on said shaft means.

16. The improved conveying system as set forth in claim 8 wherein said moving and applying means includes:

said shaft means having a first and second camming surface;
means for operatively connecting said first camming surface to said first conveying section; and
means for operatively connecting said second camming surface to said second conveying section.

17. The improved conveying system as set forth in claim 16 wherein each of said connecting means includes:
a member having a bifurcated end and a shaft end;
means for rotatably mounting the shaft end of said member to a selected one of said camming surfaces and the bifurcated end of said member to a selected one of said conveying sections.

18. The improved conveying system as set forth in claim 8 wherein said moving and applying means includes:
a pair of wheel members mounted in spaced relation on said shaft means; and
means for connecting said pair of wheels to said first and second conveying sections.

19. The improved conveying system as set forth in claim 18 wherein said connecting means includes:
a first rod having a first end pivotally mounted on each of said pair of wheel members and the second end pivotally connected to said first conveying section; and
a second rod having a first end pivotally mounted on each of said pair of wheel members and the other end pivotally connected to said second conveying section wherein the first end of said second rods and said first rods are 180° apart on their respective wheel member in a circle having its center coincident with the axis of said shaft means.

20. In a system for conveying an article wherein the system is of the type having a first article conveying means, a second article conveying means, a third article conveying means, a first means for mounting the first and second conveying means in approximately the same plane with their adjacent ends in spaced relation, a second means for mounting the third conveying means in a plane vertically spaced from and below the second conveying means, the improvement comprising:
a first conveying section having a first end and a second end;
a first means for pivotally mounting the first end of said first conveying section adjacent the first conveying means and between the first and second conveying means to provide a first article movement path along the first conveying means, said first conveying section and the second conveying means;
a second conveying section having a first end and a second end;
a second means for pivotally mounting said first end of said second conveying section adjacent an end of the third conveying means with the second end spaced from and adjacent the second end of said first conveying section;
a platform mounted above the second end of said first conveying section;
a shaft rotatably mounted on said platform and extending transverse to the article movement path;
a first pair of camming members mounted in spaced relation on said shaft;
a first pair of yokes each having a collar end rotatably mounted on the periphery of a one of said first pair of camming members and a rod pivotally connected in spaced relation to said first conveyor;
a second pair of camming members mounted in spaced relation on said shaft;
a second pair of yokes each having a collar end rotatably mounted on the periphery of a one of said second pair of camming members and a rod pivotally mounted in spaced relation to said second conveying section; and
motor means mounted on said platform and operatively connected to said shaft wherein said motor means rotates said shaft to simultaneously pivot said first conveyor section in a first direction while pivoting said second conveyor section in a second direction opposite to the first direction to align the second ends of said conveyor sections to provide a second article movement path and further rotation of said shaft simultaneously pivots said first conveyor section in the second direction and said second conveyor section in the first direction to provide the first article movement path.

21. The improved conveying system as set forth in claim 20 wherein the articles are glass sheets conveyed in close spaced relation.

22. The improved conveying system as set forth in claim 21 wherein the third conveying section includes:
conveyor means for moving the glass sheets in a direction transverse to the first article movement path.

23. A method of changing the flow direction of an article from a first predetermined path along a first conveying means to a second predetermined path along a second conveying means vertically spaced from the first conveying means, comprising the steps of:
pivotally mounting a section of the first conveying means to move through a first reciprocating arcuate path toward and away from the second conveying means;
pivotally mounting a section of the second conveying means to move through a second arcuate path toward and away from the section of the first conveying means and to move the section of the second conveying means to align the section of the first and second conveying means at a position along their respective arcuate paths;
moving at least one article along the first predetermined path toward the section of the first conveying means;
simultaneously moving the section of the first conveying means and the section of the second conveying means in opposite directions along their respective path to align the section of the first conveying means with the section of the second conveying means;
transmitting dynamic force of the section of the first conveying means as it moves toward the section of the second conveying means to the section of the second conveying means as the section of the second conveying means moves toward the section of the first conveying means; and
moving the at least one article along the section of the first and second conveying means.

24. The method as set forth in claim 23 further including the steps of:
simultaneously moving the section of the first conveying means and second conveying means away from each other to provide the first and second predetermined paths; while transmitting dynamic force of the second conveying section as it moves away from the first conveying section to the first conveying section as the first conveying section moves away from the second conveying section.

25. The method as set forth in claim 24 wherein the article is a plurality of glass sheets further including the steps of:
moving first selected ones of the plurality of sheets from the first predetermined path to the second predetermined path; and
moving second selected ones of the plurality of sheets along the first predetermined path past the first conveying section.

26. The method as set forth in claim 25 further including the step of:
advance the first selected one of the plurality of glass sheets along the second predetermined path in a direction generally transverse to the first predetermined path.

27. The method as set forth in claim 23 wherein said transmitting step is accomplished by:
operatively interconnecting the first and second sections such that the movement of a one of the conveyor sections along its arcuate path transmits a force to the other one of the sections as it moves along its arcuate path in an opposite direction to the movement of the other one of the conveying sections.

28. The method as set forth in claim 23 wherein said applying step is accomplished by:
operatively interconnecting each of the sections of the first and second conveying means to a weight.

* * * * *

UNITED STATES PATENT AND TRADEMARK OFFICE
CERTIFICATE OF CORRECTION

PATENT NO. : 4,016,969

DATED : April 12, 1977

INVENTOR(S) : Jay J. Brand

It is certified that error appears in the above-identified patent and that said Letters Patent are hereby corrected as shown below:

Column 11, Claim 8, line 50, insert --conveying-- after "second".

Signed and Sealed this

Seventh Day of June 1977

[SEAL]

Attest:

RUTH C. MASON
*Attesting Officer*

C. MARSHALL DANN
*Commissioner of Patents and Trademarks*